US007684666B2

(12) United States Patent
Hamann et al.

(10) Patent No.: US 7,684,666 B2
(45) Date of Patent: Mar. 23, 2010

(54) METHOD AND APPARATUS FOR TUNING AN OPTICAL DELAY LINE

(75) Inventors: Hendrik Hamann, Yorktown Heights, NY (US); Yurii A. Vlasov, Katonah, NY (US); Fengnian Xia, Plainsboro, NJ (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 11/558,847

(22) Filed: Nov. 10, 2006

(65) Prior Publication Data

US 2008/0112667 A1 May 15, 2008

(51) Int. Cl.
G02B 6/42 (2006.01)

(52) U.S. Cl. ............ 385/40; 385/1; 385/2; 385/3; 385/13; 385/14; 385/15; 385/30; 385/31; 385/32; 385/37; 385/41; 385/42; 385/43; 385/44; 385/46; 385/129; 385/130; 385/131; 385/132

(58) Field of Classification Search ............ 385/40–45, 385/30–32, 13, 1–3, 14–15, 129–132, 37; 350/96.14; 359/244
See application file for complete search history.

(56) References Cited

U.S. PATENT DOCUMENTS

| | | | | |
|---|---|---|---|---|
| 4,492,425 A | * | 1/1985 | Kersten et al. | 385/41 |
| 5,489,792 A | * | 2/1996 | Hu et al. | 257/347 |
| 6,341,184 B1 | * | 1/2002 | Ho et al. | 385/3 |
| 6,766,083 B2 | * | 7/2004 | Bona et al. | 385/40 |
| 6,900,920 B2 | * | 5/2005 | Chang-Hasnain et al. | 359/244 |
| 7,085,438 B2 | * | 8/2006 | Mizuno et al. | 385/3 |
| 7,088,887 B2 | * | 8/2006 | Ascanio et al. | 385/37 |
| 7,212,695 B2 | * | 5/2007 | Kasper et | 385/13 |
| 7,512,297 B2 | * | 3/2009 | Farah | 385/14 |
| 2006/0051010 A1 | | 3/2006 | Chu et al. | |

OTHER PUBLICATIONS

R.L Espinola, at al., 'Fast and Low-Power Thermooplic Switch on Thin Sillcon-on-Insulator, IEEE Photonics Technology Letters, vol. 16, No. 10, pp. 1388-1988. Oct. 2003.

Payam Rabiel et al., "Tunable Polymer Double Micro-Ring Filters," IEEE Photonics Technology Letters, vol. 15, No. 9, pp. 1255-1257, Sep. 2003.

* cited by examiner

*Primary Examiner*—Brian M. Healy
*Assistant Examiner*—Guy G Anderson

(57) ABSTRACT

The present invention is a method and an apparatus for tuning an optical delay line. In one embodiment, an optical delay line includes at least one ring resonator in which light is guided or is confined and at least one heater positioned laterally from the ring resonator. The heater produces heat in a localized area, allowing for the tuning of individual delay elements with minimal crosstalk.

20 Claims, 2 Drawing Sheets

METHOD AND APPARATUS FOR TUNING AN OPTICAL DELAY LINE

REFERENCE TO GOVERNMENT FUNDING

This invention was made with Government support under Contract No. N00014-04-C-0455 awarded by Defense Advanced Research Projects Agency (DARPA). The Government has certain rights in this invention.

BACKGROUND

The invention relates generally to optics, and relates more particularly to optical delay lines.

Optical delay lines are used a variety of applications including optical communications, radio-frequency (RF) photonics, future optical interconnects and the like. FIG. 1 is a cross-sectional view illustrating a waveguide structure 100 with tuning pads, such as may be incorporated in a conventional integrated optical delay line. The waveguide structure 100 comprises a substrate 102, a first oxide layer 104, a second oxide layer 106, a waveguide 108 and a heater 110. As illustrated, the waveguide 108 is disposed between the first oxide layer 104 and the second oxide layer 106, while the heater 110 is disposed on the second oxide layer 106, separated from the waveguide 108 by a distance, d, where d>approximately 1 µm.

The index of the waveguide 108 is tuned by manipulating the temperature of the waveguide core, using the heater 110. A common problem with waveguide structures like the waveguide structure 100, however, is that the heat produced by the heater 100 is not well confined. Only a small portion of the heat produced is actually utilized to tune the waveguide 108; hence, much of the heat consumed by the waveguide structure 100 (and associated delay line) is wasted. This negatively impacts the power consumption and operating speed of the delay line.

Moreover, many conventional optical delay lines are fabricated in fiber Bragg gratings (FBG) or in silica-on-silicon waveguide formats. In both cases (even the more compact silica waveguides), the footprint of the device tends to be quite large (e.g., approximately one to ten cm$^2$ for a delay time of approximately two ns). In addition, the ability to accurately tune the delay, which is advantageous in most optical delay line applications, has not been satisfactorily addressed in existing optical delay lines.

Finally, material requirements (among other parameters) make integration of conventional optical delay lines with other passive and active photonic devices and electric circuits impractical.

Thus, there is a need for a method and an apparatus for tuning an integrated optical delay line.

SUMMARY OF THE INVENTION

The present invention is a method and an apparatus for tuning an integrated optical delay line. In one embodiment, an optical delay line includes at least one ring resonator in which light is guided or is confined and at least one heater positioned laterally from the ring resonator. The heater produces heat in a localized area, allowing for the tuning of individual delay elements with minimal crosstalk.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for tuning an optical delay line. Embodiments of the present invention provide a compact, accurately tunable optical delay line that allows accurate tuning of the delay with a minimal number of control signals.

Figure 1:
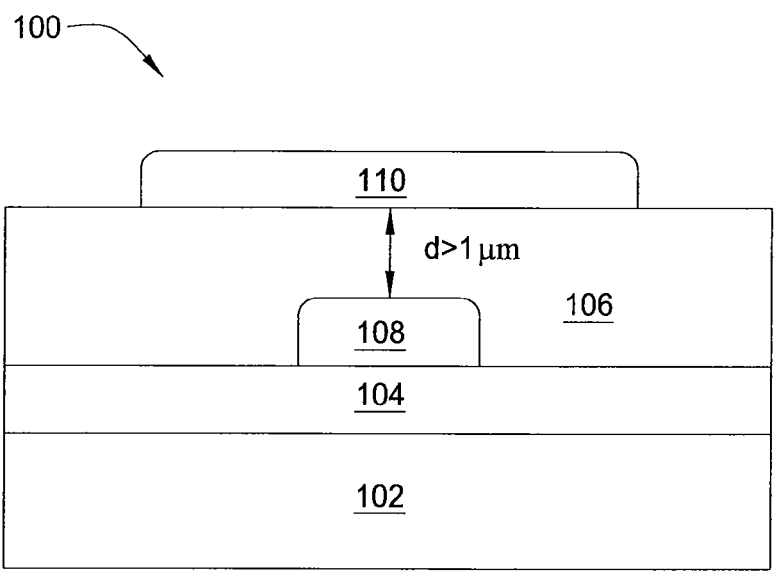
FIG. 1 is a cross-sectional view illustrating a conventional waveguide structure with tuning pads.
Figure 2:
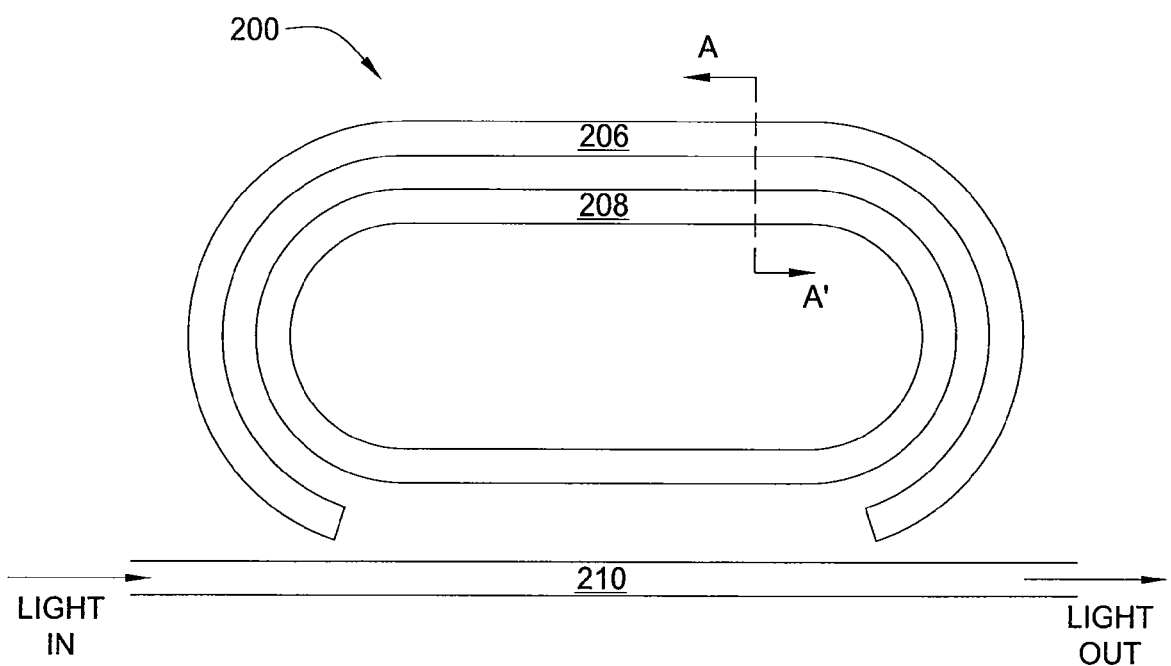
FIG. 2 is a cross-sectional view illustrating one embodiment of a tunable delay line comprising a single resonantly enhanced delay element, according to the present invention.
Figure 3:
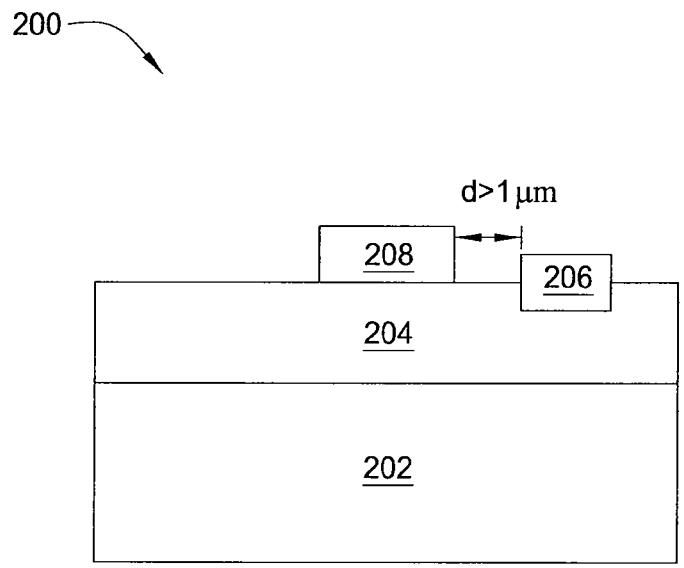
FIG. 3 is a cross sectional view illustrating the tunable delay line of FIG. 2.

FIG. 2 is a cross-sectional view illustrating one embodiment of a tunable delay line 200 comprising a single resonantly enhanced delay element, according to the present invention. FIG. 3 is a cross sectional view illustrating the tunable delay line 200 of FIG. 2 along line A-A'. In one embodiment, the delay line 200 is a silicon-on-insulator (SOI) structure. Referring simultaneously to FIGS. 2 and 3, the delay line 200 comprises a substrate 202, a buried oxide layer 204, a heater 206, a ring resonator 208 and a strip waveguide 210.

In one embodiment, the substrate 202 is formed of material having good thermal conductivity, such as silicon. The buried oxide layer 204 is formed on the substrate 202, and the heater 206, ring resonator 208 and strip waveguide 210 are in turn formed on the buried oxide layer 204. In one embodiment, the buried oxide layer 204 is etched all the way to the substrate 202 below the heater 106 and the ring resonator 208.

In one embodiment, the ring resonator 208 comprises a single-mode strip waveguide bent to form a ring. In one embodiment, the ring resonator 208 is formed of at least one of: silicon, silicon nitride or silicon oxy-nitride (where the silicon oxy-nitride has an index greater than the buried oxide layer 204). In one embodiment, the ring resonator 208 comprises a photonic wire having dimensions of approximately 0.5 micron×0.2 micron to provide tight confinement to light with a wavelength in the range of approximately 1.3 to approximately 1.55 µm. The strip waveguide 210 is positioned along a portion of the periphery of the ring resonator 208.

In one embodiment, the heater 206 is a thin film heater (e.g., formed from a conducting metal such as chromium, copper or gold). In one embodiment, the heater 206 is substantially arc-shaped and extends around at least a portion of the periphery of the ring resonator 208 (e.g., opposite from the strip waveguide 210). The heater 206 produces heat as a result of resistance to an electrical current flowing therethrough (i.e., Joule heating). In one embodiment, the heater 206 produces temperature change within only a few microns of the surrounding area.

As described above, the heater 206 and the ring resonator 208 are disposed laterally relative to each other, on a common layer of the delay line 200 (i.e., on the buried oxide layer 204). The heater 206 and the ring resonator 208 are separated on the buried oxide layer 204 by a distance, d. In one embodiment, the distance, d, between the heater 206 and the ring resonator 208 is greater than approximately 1 µm.

Due to the good thermal conductivity of the substrate 202 and removal of thick buried oxide outside of the tuning region (as illustrated in FIG. 3), heat can be produced in a localized area, allowing for the tuning of individual delay elements with minimal crosstalk. For instance, experimental results have shown that a temperature difference between the heater 206 and the ring resonator 208 as small as a factor of approximately two can be achieved utilizing the configuration of FIGS. 2 and 3. The good thermal conductivity of the substrate 202 also allows for improved tuning speed (for example, as high as approximately one MHz) by reducing the occurrence of stray heating to neighboring delay lines. In one embodiment, the speed can be further increased (e.g., to the GHz range) by adopting current injection. Moreover, due to the tightly confined optical mode in the ring resonator 208, the heater 206 can be placed on the same layer (i.e., the buried oxide layer 204) as the ring resonator 208, and spaced only a small distance therefrom, with negligible loss caused by absorption of light in the metal heater 206. The close relative placement of the heater 206 and ring resonator 208 also allows the footprint of the delay line 200 to be reduced to approximately four or five magnitudes smaller than conventional delay lines based on silica waveguides.

Etching the buried oxide layer 204 all the way to the substrate 202 below the heater 206 and the ring resonator 208, as described above, also offers additional advantages. For one, the configuration allows effective transfer of heat between the heater 206 and the ring resonator 208. For example, the temperature difference between the heater 206 and the ring resonator 208 in the illustrated embodiment may be as small as approximately a factor of two or less. In addition, the configuration reduces power consumption by limiting the available pathways for the generated heat. Moreover, because the effective thermal resistance of the heater 206 is relatively high and because the substrate 202 is a good thermal conductor (or heat sink), stray heating to neighboring delay lines can be reduced. In turn, higher tuning speeds can be obtained.

Figure 4:
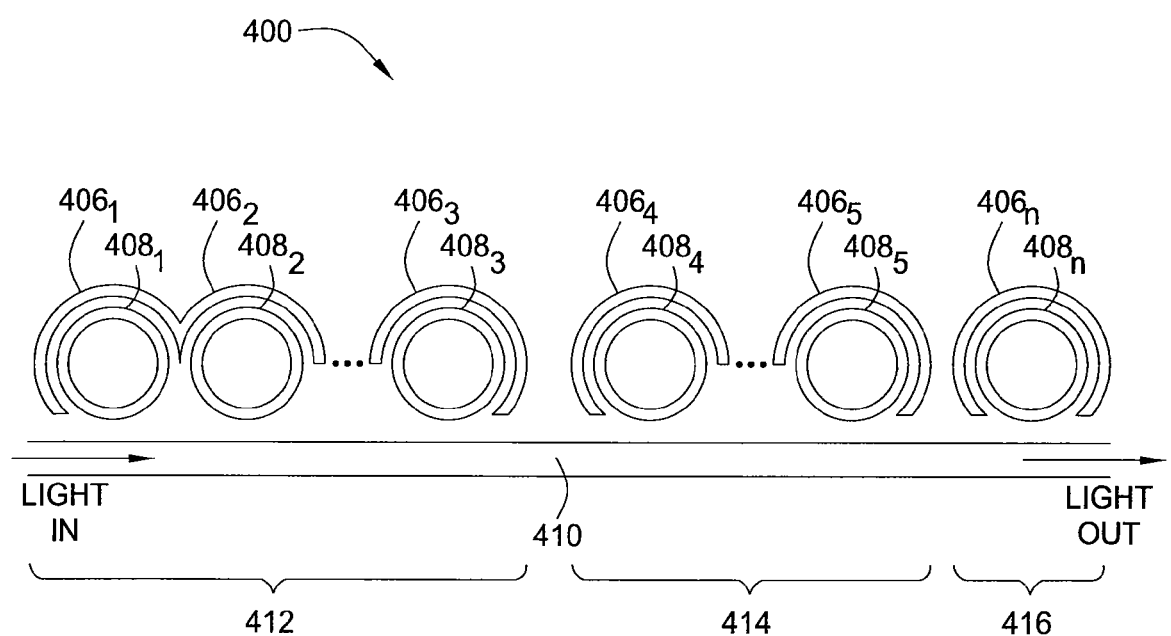
FIG. 4 is a cross-sectional view illustrating a second embodiment of tunable delay line, according to the present invention.

FIG. 4 is a cross-sectional view illustrating a second embodiment of tunable delay line 400, according to the present invention. Specifically, the delay line 400 is a multistage continuous tunable delay line 400. The delay line 400 is configured in a manner similar to the delay line 200 illustrated in FIGS. 2 and 3, but rather than a single ring resonator, comprises a plurality of ring resonators $408_1$-$408_n$ (hereinafter collectively referred to as "ring resonators 408") coupled to a strip waveguide 410. In addition, each ring resonator 408 is positioned adjacent to a heater $406_1$-$406_n$ (hereinafter collectively referred to as "heaters 406"), in a manner similar to that described above with reference to FIGS. 2 and 3.

As illustrated, the delay line 400 may comprise multiple stages of ring resonators 408. For example, the delay line 400 includes a first stage 412 including, e.g., one hundred ring resonators 408; a second stage 414 including, e.g., ten ring resonators 408; and a third stage 416 including, e.g., one ring resonator 408.

Although each ring resonator 408 is associated with its own heater 406, the heaters 406 are connected to one another in series. This configuration allows resonators 408 in each stage 412, 414 or 416 to be tuned simultaneously. However, tuning in different stages is independent. For example if each resonator 408 can provide a peak delay of approximately ten ps and the tuning error is approximately one ps, then Table I, illustrated below, summarizes the tuning range and error. It is assumed in Table I that all of the resonators 408 are substantially identical and the temperature distributions are substantially uniform across the resonators 408 in each stage 412, 414 or 416.

TABLE I

Tuning Range and Error

| | Tuning range | Error |
|---|---|---|
| $1^{st}$ stage (100 resonators) | 0-1000 ps | 100 ps |
| $2^{nd}$ stage (10 resonators) | 0-100 ps | 10 ps |
| $3^{rd}$ stage (1 resonator) | 0-10 ps | 1 ps |
| Combined | 0-1110 ps | 1 ps |

By using a three-stage tuning mechanism such as that described above, three control signals may be used to realize a total tuning range of zero to 1110 ps, with an error as small as 1 ps. This is because the error in the first stage is compensated by the second stage, and the error in the second stage is compensated by the error in the third stage. For example, for a forty Gbps optical signal, such a delay line can provide approximately forty-five bits with an error as small as 0.04 bits.

The delay line 400 thus produces more accurate tuning of the delay than is possible using conventional delay lines. This is accomplished by using the multiple delay stages 412, 414 and 416, which allow the delay error to be reduced by an order of magnitude relative to conventional delay lines. The SOI platform of the delay line 400 also provides an excellent integration platform for other active/passive photonic devices and electronic circuits.

Thus, the present invention represents a significant advancement in the field of optics. Embodiments of the present invention provide a compact, accurately tunable optical delay line that allows accurate tuning of the delay with a minimal number of control signals. Moreover, tuning speed is increased, and the ability to integrate other active/passive photonic devices and electronic circuits is enhanced.

While foregoing is directed to the preferred embodiment of the present invention, other and further embodiments of the invention may be devised without departing from the basic scope thereof, and the scope thereof is determined by the claims that follow.

The invention claimed is:

1. An optical delay line comprising:
   at least one ring resonator in which light is guided or is confined;
   at least one heater positioned laterally from the at least one ring resonator;
   a buried oxide layer on which the at least one ring resonator and the at least one heater are directly disposed; and
   a substrate disposed beneath the buried oxide layer,
   wherein the buried oxide layer is etched completely down to a surface of the substrate beneath the at least one ring resonator and the at least one heater.

2. The optical delay line of claim 1, wherein the at least one ring resonator is formed from a single-mode strip waveguide.

3. The optical delay line of claim 1, wherein the at least one ring resonator is formed from a photonic wire.

4. The optical delay line of claim 1, wherein the at least one ring resonator comprises at least one of: silicon, silicon nitride or silicon oxy-nitride.

5. The optical delay line of claim 1, wherein the at least one heater is substantially arc-shaped such that the at least one heater extends around at least a portion of a periphery of the at least one ring resonator.

6. The optical delay line of claim 1, wherein the at least one heater is a thin film heater.

7. The optical delay line of claim 1, further comprising:
a strip waveguide positioned along at least a portion of the periphery of the ring resonator.

8. The optical delay line of claim 1, wherein the at least one ring resonator comprises a plurality of ring resonators, the plurality of ring resonators being grouped into one or more stages.

9. The optical delay line of claim 8, wherein the at least one heater comprises a plurality of heaters, each of the plurality of heaters being associated with one of the plurality of ring resonators, the plurality of heaters being connected in series.

10. A method for creating optical delay, the method comprising:
providing at least one ring resonator in which light is guided or is confined;
positioning at least one heater laterally from the at least one ring resonator;
providing a buried oxide layer on which the at least one ring resonator and the at least one heater are directly disposed; and
providing a substrate disposed beneath the buried oxide layer,
wherein the buried oxide layer is etched completely down to a surface of the substrate beneath the at least one ring resonator and the at least one heater.

11. The method of claim 10, wherein the at least one ring resonator is formed from a single-mode strip waveguide.

12. The method of claim 10, wherein the at least one heater is substantially arc-shaped such that the at least one heater extends around at least a portion of a periphery of the at least one ring resonator.

13. The method of claim 10, wherein the at least one heater is a thin film heater.

14. The method of claim 10, wherein the providing at least one ring resonator comprises:
providing a plurality of ring resonators, the plurality of ring resonators being grouped into one or more stages.

15. The method of claim 14, wherein the at least one heater comprises a plurality of heaters, each of the plurality of heaters being associated with one of the plurality of ring resonators, the plurality of heaters being connected in series.

16. The method of claim 15, further comprising:
tuning the optical delay in accordance with a first delay stage, a second delay stage and a third delay stage, each of the first delay stage, second delay stage and third delay stage comprising at least one ring resonator.

17. The method of claim 16, wherein the tuning comprises, for each of the first delay stage, the second delay stage and the third delay stage:
simultaneously tuning all ring resonators in a given delay stage.

18. The method of claim 15, further comprising:
tuning the optical delay in accordance with a first delay stage, a second delay stage, and a third delay stage, wherein the second delay stage comprises a fewer number of ring resonators than the first delay stage, and the third delay stage comprises a fewer number of ring resonators than the second delay stage.

19. The optical delay line of claim 8, wherein at least one of the one or more stages includes two or more ring resonators and the at least one heater comprises a plurality of heaters, each of the two or more ring resonators being associated with a respective one of the plurality of heaters, and where the plurality of heaters are connected in series within the at least one of the one or more stages.

20. The method of claim 14, wherein at least one of the one or more stages includes two or more ring resonators and the at least one heater comprises a plurality of heaters, each of the two or more ring resonators being associated with a respective one of the plurality of heaters, and where the plurality of heaters are connected in series within the at least one of the one or more stages.

* * * * *